United States Patent [19]

Greenaway

[11] Patent Number: 4,662,653
[45] Date of Patent: May 5, 1987

[54] OPTICALLY DIFFRACTING SECURITY ELEMENT

[75] Inventor: David L. Greenaway, Oberwil, Switzerland

[73] Assignee: LGZ Landis & Gyr Zug AG, Zug, Switzerland

[21] Appl. No.: 681,555

[22] Filed: Dec. 14, 1984

[30] Foreign Application Priority Data

Jan. 3, 1984 [CH] Switzerland .............................. 5/84-0

[51] Int. Cl.$^4$ .................. B42D 15/00; B44F 1/12; B05D 5/06; G02B 5/18
[52] U.S. Cl. ........................................ 283/91; 283/904; 350/162.17; 350/162.18; 350/162.23; 350/3.7; 427/7; 427/162; 428/30; 428/915; 428/916
[58] Field of Search ..................... 350/162.17, 162.18, 350/162.23, 3.61, 3.7; 283/91, 904, 86; 428/30, 915, 916; 427/162, 7

[56] References Cited

U.S. PATENT DOCUMENTS 4,094,575 6/1978 Kellie .
4,129,382 12/1978 Greenaway .
4,476,161 10/1984 Pohle et al. .......................... 427/162
4,490,440 12/1984 Reber .............................. 350/162.18

FOREIGN PATENT DOCUMENTS 2321158 3/1977 France .
635949 4/1983 Switzerland .
2054890 2/1981 United Kingdom .
2093404 9/1982 United Kingdom .

*Primary Examiner*—John K. Corbin
*Assistant Examiner*—Edmondson
*Attorney, Agent, or Firm*—Marmorek, Guttman & Rubenstein

[57] ABSTRACT

A security element for authenticating bank notes, credit cards, security passes and the like is disclosed. The security element incorporates a reflective-type diffraction grating, which grating comprises a continuous layer of reflecting material on which is deposited a layer of dielectric material. Non-continuous reflecting layer portions are embedded in the dielectric material. It is practically impossible to lay bare the diffraction grating without destroying it.

10 Claims, 3 Drawing Figures ic structure can be reproduced using relatively accessible technology.

It is an object of the present invention to provide an optically diffracting security element for use in authenticating sheet materials such as bank notes and credit cards which overcomes these difficulties and offers a higher degree of security than the security elements heretofore discussed.

OPTICALLY DIFFRACTING SECURITY ELEMENT

FIELD OF INVENTION

This invention relates to a device for authenticating sheet materials which are subject to counterfeiting, such as bank notes, credit cards, passports, and security passes.

BACKGROUND OF THE INVENTION

Most currently used credit cards, bank notes, passports, and security passes can be forged or falsified with little difficulty using modern reproduction methods. Accordingly, numerous attempts have been made to store authenticating information on credit cards, bank notes and the like to increase the difficulty of forgery or falsification. For example, authenticating information may be recorded in the form of magnetic or optical markings which can be read with the aid of machines.

An effective known method for protecting sheet materials against forgery involves use of a diffraction grating with a well defined structure representing the authenticating information. When illuminated, such a diffracting grating produces a particular diffraction pattern, characteristic of the authenticating information. One such diffraction grating mounted on an information carrier such as a credit card or bank note is disclosed in U.S. Pat. No. 4,129,382. The diffraction grating disclosed in this reference comprises an optically transparent body with parallel elongated ridges formed therein.

U.K. Patent Application GB No. 2054 890 A discloses another type of diffraction grating. A reflecting grating for a Moiré fringe measuring system is formed from a member of stainless steel having a polished surface. A coating of an optically transparent material is formed on the polished surface. Parts of the coating are removed to form a pattern of parallel ridges and grooves, the bottommost surfaces of the grooves being defined by exposed areas of stainless steel.

Mass manufacture of diffractive type security elements is often accomplished by means of an embossing process. An embossing mold which carries a micro-relief structure is used to impress the micro-relief structure onto a substrate, thereby forming a light-diffracting relief structure which stores authenticating information. Typically, the substrate is a thermoplastic material. The light diffracting structure may be a hologram or a diffraction grating.

Visual or machine identification of the authenticating information is advantageously effected when the diffracting structure reflects rather than transmits incident radiation. To form a reflecting type diffracting structure, the micro-relief structure formed on the thermoplastic substrate is coated with a reflecting metallic film. Typically, a transparent protective layer is then placed over the metallic film. Such a security element is disclosed in CH-PS No. 635-949. A similar security element is disclosed in U.K. patent application GB No. 2093404A.

While useful under many circumstances, the above described reflective/diffractive security element may not always provide adequate security. One reason for this is that the transparent covering layer can be removed, thereby exposing the metallic coated light diffracting structure. Once exposed, this type of light dif-

SUMMARY OF THE INVENTION

The present invention is a security element for authenticating sheet materials such as bank notes, credit cards, security passes, and passports. In a preferred embodiment, the security element comprises a continuous reflecting surface, a dielectric layer formed contiguous with the reflecting surface, and a plurality of non-continuous reflecting surface portions embedded in the dielectric layer in a predetermined arrangement so as to store authenticity information. The continuous reflecting surface together with the non-continuous reflecting surface portions form a light diffracting structure such as a hologram or diffraction grating. The light diffracting structure is capable of reflecting and diffracting incident radiation into a particular pattern characteristic of the predetermined arrangement of non-continuous reflecting surface portions.

The security element is formed by depositing a first layer of dielectric material on a first continuous reflecting surface. A layer of reflecting material such as a metal is then deposited on the dielectric layer to form a second continuous reflecting surface. Using, for example, a photolithographic process, portions of the second continuous reflecting surface are removed to form a predetermined arrangement of non-continuous reflecting surface portions. A second layer of dielectric material is then deposited over the non-continuous reflecting surface portions as well as exposed portions of the first dielectric layer to form the security element.

The security element of the present invention offers two advantages not found in prior art diffractiontype security elements. First, any attempt to expose the light diffracting structure incorporated into the security element, as by removing the dielectric layer in which the non-continous reflecting surface portions are embedded, will most likely result in destruction of the light diffracting structure. Secondly, fraudulent reproduction of the inventive security element requires use of the same complex technological procedures as were originally carried out to manufacture the security element in the first place. The coating and photolithography technology which are utilized to manufacture the security element of the present invention are complex to master, expensive, and relatively inaccessible. Thus, the security element of the present invention provides clear advantages over the prior art type diffractive security elements.

DETAILED DESCRIPTION OF THE INVENTION

Figure 1:
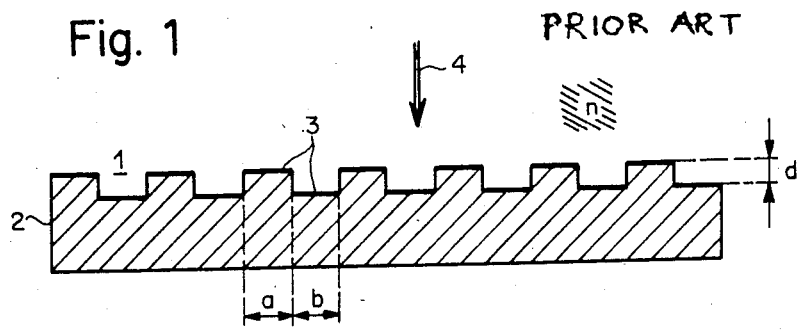
FIG. 1 schematically illustrates a reflecting type diffraction grating of the type incorporated into prior art security elements.

Before describing the present invention, it is useful to look first at a diffraction grating of the type which has been incorporated into prior art security elements. Turning to FIG. 1, the reflecting type diffraction grating 1 comprises a substrate 2 which has been provided with a periodic array of parallel rectangular ridges, adjacent ridges being separated by rectangular grooves. A reflecting material such as a metal has been deposited on the substrate to form a reflecting layer 3. In the diffraction grating 1 of FIG. 1, the width of a ridge has been designated a, the width of a groove has been designated b, and the depth of a groove has been designated d. For a given wavelength of incident radiation 4, the diffraction pattern of radiation produced by the grating 1 depends upon the dimensions a, b, and d, as well as on the index of refraction n of the medium through which the diffraction grating is scanned by the incident radiation 4.

As previously indicated, the diffraction grating 1 of FIG. 1 suffers from two disadvantages when it is incorporated as part of a security element. It is relatively easy to expose the diffraction grating 1 by removing the protective dielectric layer and once exposed it is possible to reproduce the diffraction grating 1.

Figure 2:
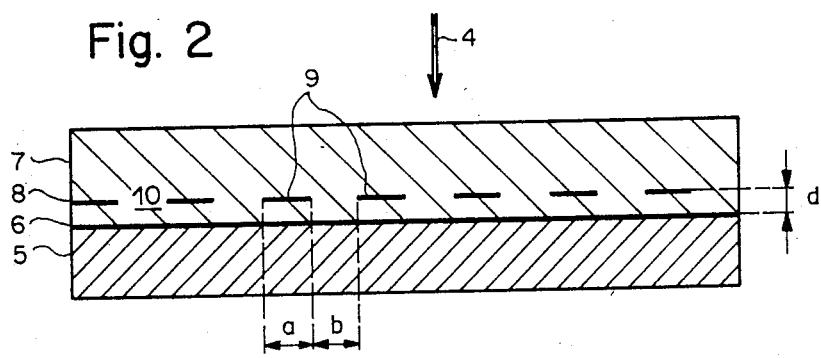
FIG. 2 schematically illustrates a security element in accordance with an illustrative embodiment of the present invention.

FIG. 2 shows a security element in accordance with the present invention. The substrate 5 is coated with a continuous reflecting layer 6. A transparent dielectric layer 7 is deposited on top of the reflecting layer 6. A plurality of non-continuous reflecting layer portions 9 are embedded in the dielectric layer 7. In the illustrative embodiment of the invention shown in FIG. 2, the non-continuous reflecting layer portions 9 are in the form of parallel strips of width a, which strips are spaced apart from one another by distance b. The continuous reflecting layer 6 and the non-continuous reflecting layer portions 9 are parallel to each other, being separated by the distance d.

The strips 9 together with the continuous reflecting layer 6 form a light diffracting structure 10 which displays an optical behavior similar to the diffraction grating 1 of FIG. 1. When the radiation 4 is incident on the light diffracting structure 10, the resulting diffraction pattern depends upon the characteristic geometry of the non-continuous reflecting layer portions 9. For the diffracting structure 10 of FIG. 2, the diffraction pattern is characterized by the dimensions a, b, and d. Note, the dielectric layer 7 may be transparent to radiation in the visible portion of the spectrum or only to radiation in the infrared part of the spectrum. In the latter case, the diffracting structure 10 will not be visible to the human eye.

Figure 3:
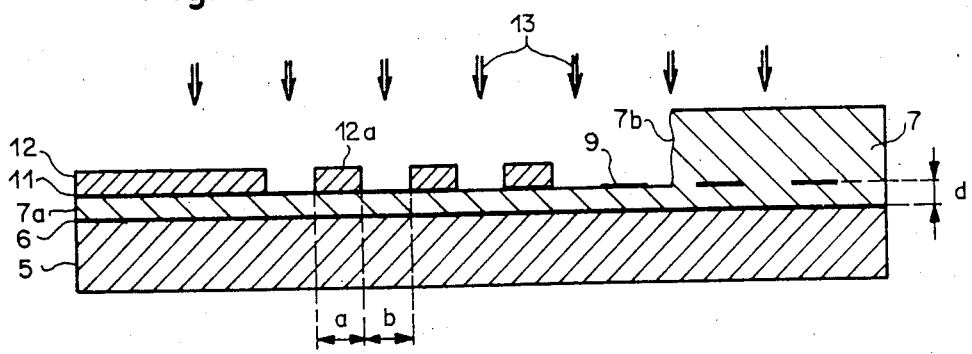
FIG. 3 schematically illustrates the security element of FIG. 2 at different stages of its manufacture.

An advantageous process for manufacturing the security element of FIG. 2 will now be described. Scanning FIG. 3 from left to right, the manufacturing stages of the security element of FIG. 2 are illustrated. A metallic material is deposited using known processes on the substrate 5 to form the continuous reflecting layer 6. The reflective layer 6 is then coated with a first layer of optically transparent dielectric material 7a, which layer has the predetermined thickness d. Onto the layer of dielectric material 7a, a second continuous metallic layer 11 is formed. The non-continuous reflecting layer portions 9 are formed from the continuous metallic layer 11.

To form the non-continuous reflecting layer portions 9, a thin coating 12 of photoresist (for example the positive photoresist, Shipley AZ 1340) is applied to the metallic layer 11. While the thickness of the photoresist coating 12 is not critical, it is desirable that the coating 12 be of a relatively uniform thickness, which thickness is small compared to the dimensions a and b.

Selected portions of the photoresist coating are then exposed to radiation. The portions of the coating 12 to be illuminated are located over those portions of layer 11 which are to be removed. This selective illumination may be effected by means of interfering coherent light beams or be means of a photolithographic mask and a suitable light source. Following illumination, the photoresist layer 12 is developed, leaving behind unilluminated photoresist ridges 12a which ridges are separated by exposed portions of metallic layer 11. With a suitable corrosive agent, the exposed portions of layer 11 are removed, while layer 7a of the dielectric material remains intact. In a second illumination and developing step, the photoresist ridges 12a are removed, leaving behind the non-continuous reflecting layer portions 9. Onto the reflecting layer portions 9 and onto the exposed portions of dielectric layer 7a, a second layer of dielectric material 7b is deposited. The layers 7a and 7b are formed from the same material and together form the homogeneous dielectric layer 7. The thickness of the layer 7b is not critical, and it may be large in comparison to the thickness d.

The security element of FIG. 2 may be manufactured by a process other than that described above. For example, instead of using a positive photoresist coating as described above, a negative photoresist may be used. One way to use a negative photoresist is as follows. A layer of negative photoresist is applied onto the reflective layer 6. Upon illumination, the layer of negative photoresist will form the layer 7a. The metallic reflecting layer 11 is then deposited on the layer 7a. A second layer of negative photoresist is then deposited on the reflecting layer 11. Selective illumination of the second negative photoresist layer followed by a developing step results in formation of the photoresist ridges 12a, which ridges are separated by exposed portions of the metallic layer 11. A corrosive agent is then used to remove the exposed portions of the metallic layer 11. The resulting structure is then covered with a further layer of negative photoresist, which upon illumination forms the layer 7b. This latter layer covers the ridges 12a and fills the spaces betwwen the ridges 12a.

In yet another alternative process, the layer 7b of dielectric material may be formed first. This would then be followed by the formation thereon of the noncontinuous reflecting layer portions 9. This structure is then coated with the layer 7a of dielectric material, after which the continuous reflecting layer 6 is formed.

The security provided by the security element of the present invention is quite high. Its manufacture requires the use of sophisticated coating and photolithographic technology. This technology is difficult to master and involves the use of expensive equipment. In addition to mastering the technology, a potential falsifier of the inventive security element would have to know the details of the light diffracting structure incorporated therein, e.g., the dimensions, a, b, and d. However, it is practically impossible to expose the light diffracting structure without destroying it. Any attempt to remove the dielectric layer 7 by chemical or physical processes in order to get to the light diffracting structure 10 will almost certainly result in the destruction of the light diffracting structure 10. One reason for this is that the non-continuous metallic layer portions 9 are extremely thin (e.g., on the order of a few hundred Angstroms). The distance d is typically somewhat larger than this (e.g., on the order of a thousand Angstroms or roughly a quarter of the wavelength of the incident light beam 4 used to "read" the light diffracting structure 10).

When the diffracting structure 10 is formed as a diffraction grating, as shown in FIG. 2, it is desirable that the periodic pattern of non-continuous reflecting layer portions 9 have a period on the order of 10 microns or less (i.e., the grating constant or the sum of the a and b dimensions is on the order of 10 microns or less). This helps to ensure that diffraction effects predominate so that a high level of security against falsification is achieved. It should be noted, that by varying the orientation of or the distance between the non-continuous reflecting layer portions, security against falsification can be further enhanced.

There exists numerous ways for applying the security element of the present invention to sheet materials such as documents, bank notes, credit cards, security passes and the like. For example, the underside of the security element may be affixed to the sheet material by way of a glue layer. Similarly, if the sheet material is transparent, a transparent glue layer may be used to affix the grating side of the security element to the underside of the sheet material. This arrangement may be especially useful in a system in which it is desirable to read authenticating information from one side of a transparent credit card, while modifying or destroying the authenticating information, as for example, applying heat to the other side of the credit card. Alternatively, when the dielectric layer 7 is formed from a material having appropriate thermal properties (e.g., thermoplastic material), the security element may be applied by hot lamination to credit cards and the like which are formed from plastic.

Finally, the above described embodiments of the invention are intended to be illustrative only. Numerous alternative embodiments may be devised by those skilled in the art without departing from the spirit and scope of the claims which follow.

I claim:

1. A security element for authenticating sheet material comprising
   (a) a continuous reflecting layer,
   (b) a dielectric layer formed contiguous with said continuous reflecting layer, and
   (c) a plurality of non-continuous reflecting layer portions embedded in said dielectric layer in a predetermined arrangement so as to store authenticity information,
   said continuous reflecting layer and said reflecting layer portions forming a light-diffracting structure capable of diffracting incident radiation into a particular pattern characteristic of said predetermined arrangement of non-continuous reflecting layer portions, thereby authenticating said sheet material.

2. The security element of claim 1 wherein said continuous reflecting layer and said non-continuous reflecting layer portions lie in parallel planes.

3. The security element of claim 1 wherein said light diffracting structure formed by said continuous reflecting layer and said plurality of non-continuous reflecting layer portions is a hologram.

4. The security element of claim 1 wherein said continuous reflecting layer and said plurality of non-continuous reflecting layer portions form a diffraction grating.

5. The security element of claim 4 wherein said diffraction grating has a grating constant on the order of 10 microns or less.

6. The security element of claim 1 wherein said security element further comprises a substrate, said continuous reflecting layer being mounted on said substrate.

7. The security element of claim 1 wherein said plurality of non-continuous reflecting layer portions are arranged in a periodic pattern, the period of said pattern being on the order of 10 microns or less.

8. A process for forming a phase-diffractive-type security element capable of diffracting incident light into a characteristic pattern for authenticating sheet materials, said process comprising the steps of
   (a) depositing a first layer of dielectric material on a first continuous reflecting surface,
   (b) depositing on said first layer of dielectric material a layer of reflecting material to form a second continuous reflecting surface,
   (c) removing portions of said second continuous reflecting surface to form a plurality of non-continuous reflecting surface portions arranged in a predetermined pattern and located in a plane separated from the continuous reflecting layer by a predetermined distance to store authenticity information,
   (d) depositing a second dielectric layer over said plurality of non-continuous reflecting surface portions and said security element.

9. The process of claim 8 wherein said step of removing portions of said second continuous reflecting surface includes the steps of
   coating said second continuous reflecting surface with a photoresist material and illuminating selected portions of said photoresist material with radiation.

10. A security element for authenticating sheet material comprising
    a continuous reflecting layer,
    a dielectric layer formed continuous with said continuous reflecting layer, and
    a plurality of non-continuous reflecting layer portions embedded in said dielectric layer in a predetermined arrangement in a plane located a predetermined distance from said continuous reflecting layer to store authenticity information,
    said continuous reflecting layer and said reflecting layer portions forming a light-diffracting structure capable of diffracting incident radiation into a particular pattern characteristic of the predetermined arrangement of noncontinuous reflecting layer portions and said predetermined distance, thereby authenticating said sheet material.

* * * * *